US012810727B2

(12) United States Patent
Kashiwakura et al.

(10) Patent No.: US 12,810,727 B2
(45) Date of Patent: Nov. 24, 2026

(54) ROADSIDE APPARATUS, SYSTEM, AND OPERATING METHOD OF SYSTEM

(71) Applicant: TOYOTA JIDOSHA KABUSHIKI KAISHA, Toyota (JP)

(72) Inventors: Toshiki Kashiwakura, Ota-ku Tokyo-to (JP); Chihiro Inaba, Nerima-ku Tokyo-to (JP); Shoi Suzuki, Ota-ku Tokyo-to (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 19/000,936

(22) Filed: Dec. 24, 2024

(65) Prior Publication Data

US 2025/0218294 A1 Jul. 3, 2025

(30) Foreign Application Priority Data

Dec. 28, 2023 (JP) ................................. 2023-223194

(51) Int. Cl.

| | |
|---|---|
| ***G08G 1/0967*** | (2006.01) |
| ***G06V 20/54*** | (2022.01) |
| ***G08G 1/005*** | (2006.01) |
| ***G08G 1/01*** | (2006.01) |

(52) U.S. Cl.
CPC ....... *G08G 1/096783* (2013.01); *G06V 20/54* (2022.01); *G08G 1/005* (2013.01); *G08G 1/0116* (2013.01); *G06V 2201/08* (2022.01)

(58) Field of Classification Search
CPC ............. G08G 1/096783; G08G 1/005; G08G 1/0116; G06V 20/54; G06V 2201/08
USPC .......................................................... 340/907
See application file for complete search history.

(56) References Cited

U.S. PATENT DOCUMENTS

| | | | | |
|---|---|---|---|---|
| 10,235,882 | B1 * | 3/2019 | Aoude | G08G 1/164 |
| 11,443,631 | B2 * | 9/2022 | Manohar | B60Q 9/008 |
| 11,688,282 | B2 * | 6/2023 | Manohar | B60Q 9/008 340/903 |
| 11,816,981 | B2 * | 11/2023 | Dulberg | G08G 1/0116 |
| 2019/0088112 | A1 * | 3/2019 | Jung | G08G 1/166 |
| 2020/0242922 | A1 * | 7/2020 | Dulberg | G08G 1/166 |
| 2021/0065551 | A1 * | 3/2021 | Manohar | B60Q 9/008 |
| 2021/0407291 | A1 * | 12/2021 | Xia | G08G 1/0116 |
| 2022/0406187 | A1 * | 12/2022 | Kurehashi | B60W 30/0953 |
| 2023/0112079 | A1 * | 4/2023 | Manohar | B60Q 9/008 340/903 |
| 2023/0316907 | A1 * | 10/2023 | Ramamurthy | G08G 1/0133 |
| 2023/0316912 | A1 * | 10/2023 | Ramamurthy | G08G 1/096783 701/119 |

(Continued)

FOREIGN PATENT DOCUMENTS

JP 2023-050629 A 4/2023

*Primary Examiner* — Zhen Y Wu
(74) *Attorney, Agent, or Firm* — Dinsmore & Shohl LLP

(57) ABSTRACT

A roadside apparatus includes a communication interface configured to transmit and receive information, an imager configured to capture images of a pedestrian, an output interface configured to output information for the pedestrian, and a controller configured to transmit, to a vehicle, first information indicating an approach of the pedestrian to a roadway based on the captured images, and thereafter output second information to alert the pedestrian for the vehicle.

17 Claims, 4 Drawing Sheets

(56) References Cited

U.S. PATENT DOCUMENTS

| | | | | |
|---|---|---|---|---|
| 2023/0396958 | A1* | 12/2023 | Lund | H04W 4/027 |
| 2023/0401960 | A1* | 12/2023 | Manohar | B60Q 9/008 |
| 2024/0038058 | A1* | 2/2024 | Sadu | H04L 67/12 |
| 2024/0339033 | A1* | 10/2024 | Chamberlin | G08G 1/166 |
| 2025/0166508 | A1* | 5/2025 | Berezin | G06V 20/54 |

* cited by examiner

ROADSIDE APPARATUS, SYSTEM, AND OPERATING METHOD OF SYSTEM

CROSS-REFERENCE TO RELATED APPLICATION

This application claims priority to Japanese Patent Application No. 2023-223194, filed on Dec. 28, 2023, the entire contents of which are incorporated herein by reference.

TECHNICAL FIELD

The present disclosure relates to a roadside apparatus, a system, and an operating method of a system.

BACKGROUND

Roadside apparatuses, such as traffic signals, that alert pedestrians walking on roads with audio or the like in order to assist the pedestrians in safe walking are known. Patent Literature (PTL) 1 discloses a notification system that, according to the behavior of an automated driving vehicle scheduled to pass through a predetermined traffic area, notifies other vehicles, pedestrians, and the like of traffic availability and alerts.

CITATION LIST

Patent Literature

PTL 1: JP 2023-050629 A

SUMMARY

In the provision of information to improve traffic safety by avoiding contact between pedestrians and vehicles, there is room to reduce stress on the pedestrians who are alerted and to improve convenience.

The present disclosure relates to a roadside apparatus and the like that can reduce stress on pedestrians and improve convenience in the provision of information for traffic safety.

A roadside apparatus according to the present disclosure includes:

- a communication interface configured to transmit and receive information;
- an imager configured to capture an image of a pedestrian;
- an output interface configured to output information for the pedestrian; and
- a controller configured to transmit, to a vehicle, first information indicating an approach of the pedestrian to a roadway based on the captured image, and thereafter output second information to alert the pedestrian for the vehicle.

A system according to the present disclosure includes:

- a server apparatus; and
- a roadside apparatus,
- wherein
- the roadside apparatus is configured to transmit, to the server apparatus, first information indicating an approach of a pedestrian to a roadway based on a captured image of the pedestrian, and thereafter output second information to alert the pedestrian for a vehicle traveling toward the roadside apparatus, and
- the server apparatus is configured to transmit the first information to the vehicle.

An operating method of a system according to the present disclosure is an operating method of a system including a server apparatus and a roadside apparatus, the operating method including:

- transmitting, by the roadside apparatus to the server apparatus, first information indicating an approach of a pedestrian to a roadway based on a captured image of the pedestrian, and thereafter outputting, by the roadside apparatus, second information to alert the pedestrian for a vehicle traveling toward the roadside apparatus; and
- transmitting, by the server apparatus, the first information to the vehicle.

The roadside apparatus and the like according to the present disclosure can reduce stress on pedestrians and improve convenience in the provision of information for traffic safety.

DETAILED DESCRIPTION

An embodiment will be described below with reference to the drawings.

Figure 1:
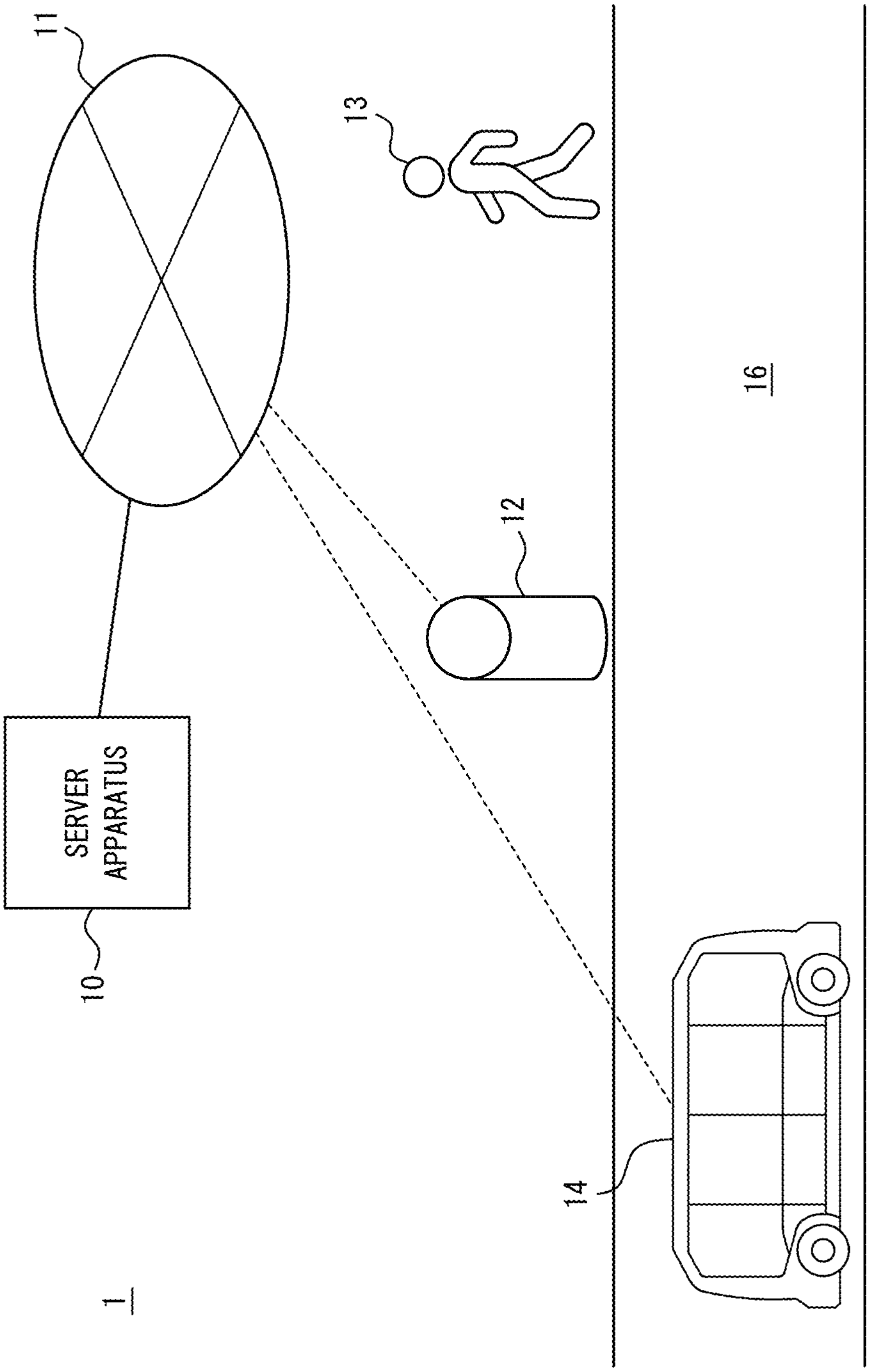
FIG. 1 is a diagram illustrating an example configuration of an information provision system.

FIG. 1 is a diagram illustrating an example configuration of an information provision system according to the embodiment. The information provision system 1 includes at least one server apparatus 10, one or more roadside apparatuses 12, and one or more vehicles 14 that are communicably connected to each other via a network 11.

The server apparatus 10 is, for example, a server computer that belongs to a cloud computing system or other computing systems and functions as a server that implements various functions. The server apparatus 10 may be configured with two or more server computers that are communicably connected to each other and operate in cooperation with each other. The server apparatus 10 corresponds to "information processing apparatus" in the present embodiment.

The network 11 is the Internet, for example. The network 11 may include a mobile communication network, an ad hoc network, a local area network (LAN), a metropolitan area network (MAN), other networks, or any combination thereof.

The roadside apparatuses 12 are movable apparatuses that are installed at any points along roadways 16, e.g., at ends of sidewalks bordering the roadways 16, and are configured to be operable with internal batteries, for example. The roadside apparatuses 12 capture images of pedestrians 13 passing on the sidewalks, and output, based on the captured images, various types of information to assist the pedestrians 13 in walking. The roadside apparatuses 12 are configured to be communicable with the server apparatus 10 via the network 11.

The vehicles 14 are passenger cars or commercial vehicles with communication functions and information processing functions, and are connected to the network 11 via a mobile communication network. Each vehicle 14 is equipped with a control apparatus with an interface that accepts operations for inputting various types of information by occupants and outputs various types of information to the occupants. Each vehicle 14 has one or more GNSS receivers, and is configured to be able to detect the current position. The vehicles 14 are automated driving vehicles the driving of which is, while being supported appropriately by assistant drivers, automated at any level, such as one of Level 1 to Level 5 defined by the Society of Automotive Engineers (SAE). The vehicles 14 may be battery electric vehicles (BEVs) or hybrid electric vehicles (HEVs) that use battery power for at least a part of energy for driving.

In the information provision system 1, each roadside apparatus 12 transmits, to each vehicle 14, information (hereinafter referred to as "pedestrian approach information") indicating an approach of a pedestrian 13 to a roadway 16 based on captured images of the pedestrian 13, and thereafter outputs information (hereinafter referred to as "alert information") to alert the pedestrian 13 for the vehicle 14. In the vehicle 14, the control apparatus or assistant driver of the vehicle 14 can know, from the pedestrian approach information, that the pedestrian 13 is approaching the roadway 16, before the vehicle 14 closest approaches and passes by the point at which the roadside apparatus 12 is installed. On the other hand, the pedestrian 13 can cross the roadway 16 with some time to spare, without being alerted more than necessary, while there is some grace before the vehicle 14 closest approaches. When the vehicle 14 closest approaches, the pedestrian 13 is alerted as necessary. Therefore, it is possible to reduce stress on pedestrians and improve convenience in the provision of information for traffic safety.

Figure 2:
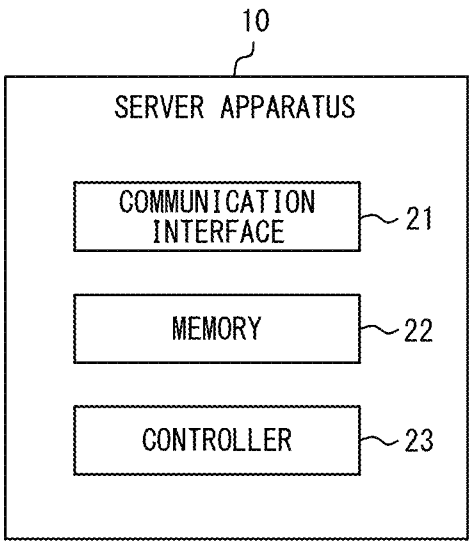
FIG. 2 is a diagram illustrating an example configuration of a server apparatus.

FIG. 2 is a diagram illustrating a configuration example of the server apparatus 10. The server apparatus 10 includes a communication interface 21, a memory 22, and a controller 23. In a case in which the server apparatus 10 is configured with two or more server computers, these configurations are appropriately arranged on the two or more server computers.

The communication interface 21 includes one or more interfaces for communication. The interfaces for communication include, for example, a LAN interface. The communication interface 21 receives information to be used for operations of the server apparatus 10 and transmits information obtained by the operations of the server apparatus 10. The server apparatus 10 is connected to the network 11 by the communication interface 21, and communicates with the roadside apparatuses 12 and the like over the network 11.

The memory 22 includes, for example, one or more semiconductor memories, one or more magnetic memories, one or more optical memories, or a combination of at least two of these types, to function as main memory, auxiliary memory, or cache memory. The semiconductor memories are, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 22 stores information to be used for the operations of the server apparatus 10 and information obtained by the operations of the server apparatus 10.

The controller 23 includes one or more processors, one or more dedicated circuits, or a combination thereof. The processors are general purpose processors, such as central processing units (CPUs), or dedicated processors, such as graphics processing units (GPUs), specialized for particular processes. The dedicated circuits are, for example, field-programmable gate arrays (FPGAs), application specific integrated circuits (ASICs), or the like. The controller 23 executes information processing related to the operations of the server apparatus 10 while controlling components of the server apparatus 10. The functions of the server apparatus 10 are realized by the processors included in the controller 23 executing a control program. The control program is a program for causing a computer to function as the server apparatus 10. Some or all of the functions of the server apparatus 10 may be realized by the dedicated circuits included in the controller 23. The control program may be stored on a non-transitory recording/storage medium readable by the server apparatus 10, and be read from the medium by the server apparatus 10.

Figure 3:
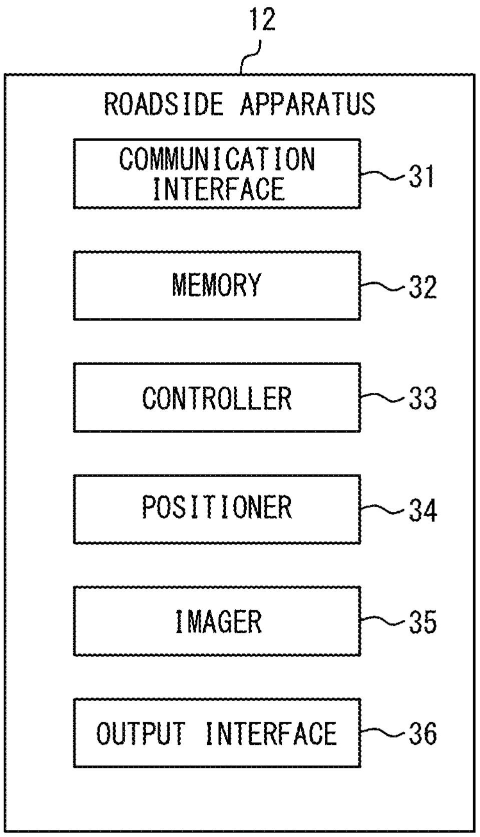
FIG. 3 is a diagram illustrating an example configuration of a roadside apparatus.

FIG. 3 is a diagram illustrating an example configuration of each roadside apparatus 12. Each roadside apparatus 12 includes a communication interface 31, a memory 32, a controller 33, a positioner 34, an imager 35, and an output interface 36.

The communication interface 31 includes a communication module compliant with a wired or wireless LAN standard, a module compliant with a mobile communication standard, or the like. For example, the mobile communication standard includes Long Term Evolution (LTE), 4th Generation (4G), 5th Generation (5G), or the like. The roadside apparatus 12 is connected by the communication interface 31 to the network 11 via a nearby router apparatus or a mobile communication base station, and communicates with the server apparatus 10 and the like over the network 11.

The memory 32 includes, for example, one or more semiconductor memories, one or more magnetic memories, one or more optical memories, or a combination of at least two of these types. The semiconductor memories are, for example, RAM or ROM. The RAM is, for example, SRAM or DRAM. The ROM is, for example, EEPROM. The memory 32 stores information to be used for operations of the controller 33 and information obtained by the operations of the controller 33.

The controller 33 has one or more general purpose processors such as CPUs or micro processing units (MPUs), or one or more dedicated processors that are dedicated to specific processing. Alternatively, the controller 33 may have one or more dedicated circuits such as FPGAs or ASICs. The controller 33 performs overall control of operations of the roadside apparatus 12 by operating according to control/processing programs or operating according to operation procedures implemented in the form of circuits. The controller 33 then transmits and receives various types of information to and from the server apparatus 10 and the like via the communication interface 31, and executes operations according to the present embodiment. The functions of the controller 33 are realized by the processors included in the controller 33 executing a control program. The control program is a program for causing the processor to function as the controller 33. Some or all of the functions of the controller 33 may be realized by the dedicated circuits included in the controller 33.

The positioner 34 includes one or more Global Navigation Satellite System (GNSS) receivers. The GNSS includes, for example, Global Positioning System (GPS), Quasi-Zenith Satellite System (QZSS), BeiDou, Global Navigation Satellite System (GLONASS), and/or Galileo. Based on information acquired by the positioner 34, location information on the roadside apparatus 12 is obtained.

The imager 35 is a visible light camera that is installed in such a position that can image external surroundings of the roadside apparatus 12. The camera captures a series of images of a subject at, for example, 15 to 30 frames per second. The imager 35 transmits the captured images to the controller 33.

The output interface 36 includes one or more interfaces for output. The interfaces for output include, for example, a display or a speaker. The display is, for example, illumination with Light Emitting Diodes (LEDs) or a message board. The output interface 36 outputs information under the control of the controller 33.

Figure 4:
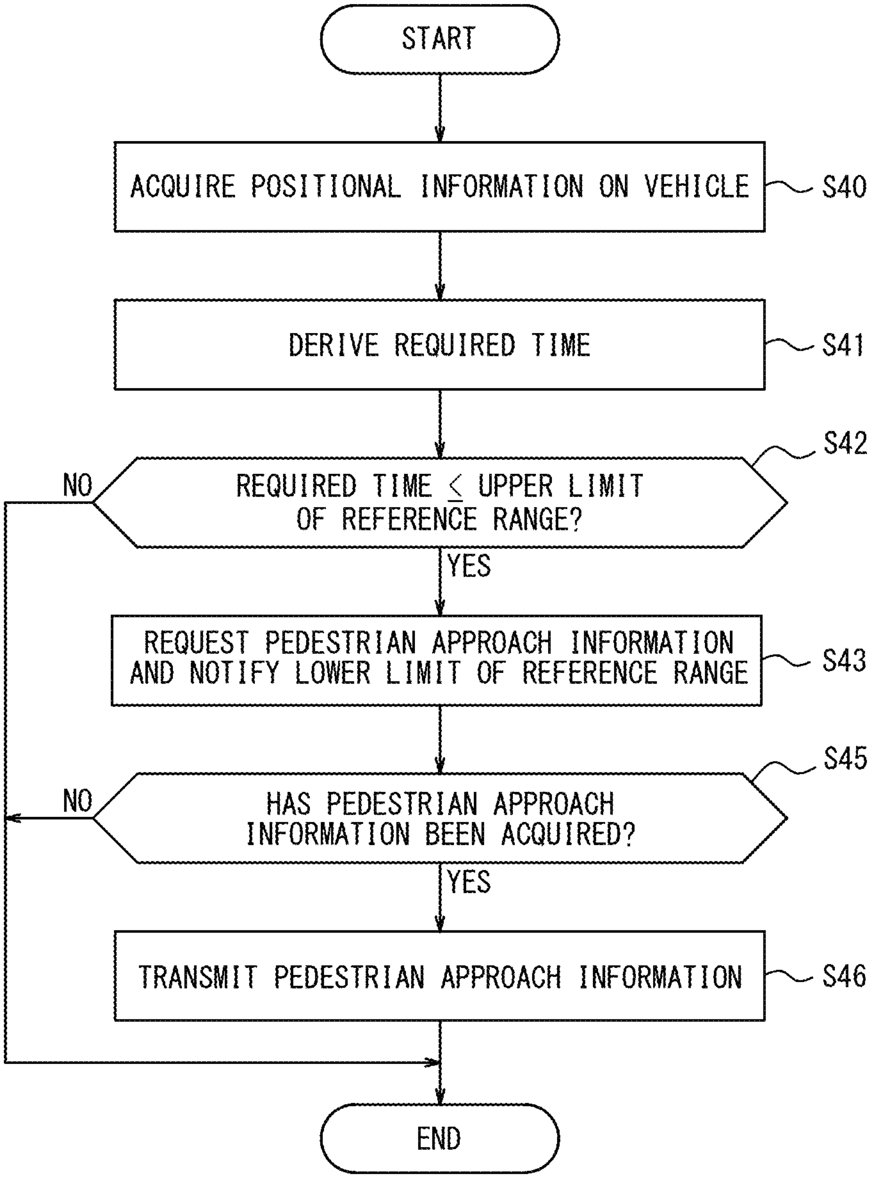
FIG. 4 is a diagram illustrating an example operation procedure of the server apparatus.
Figure 5:
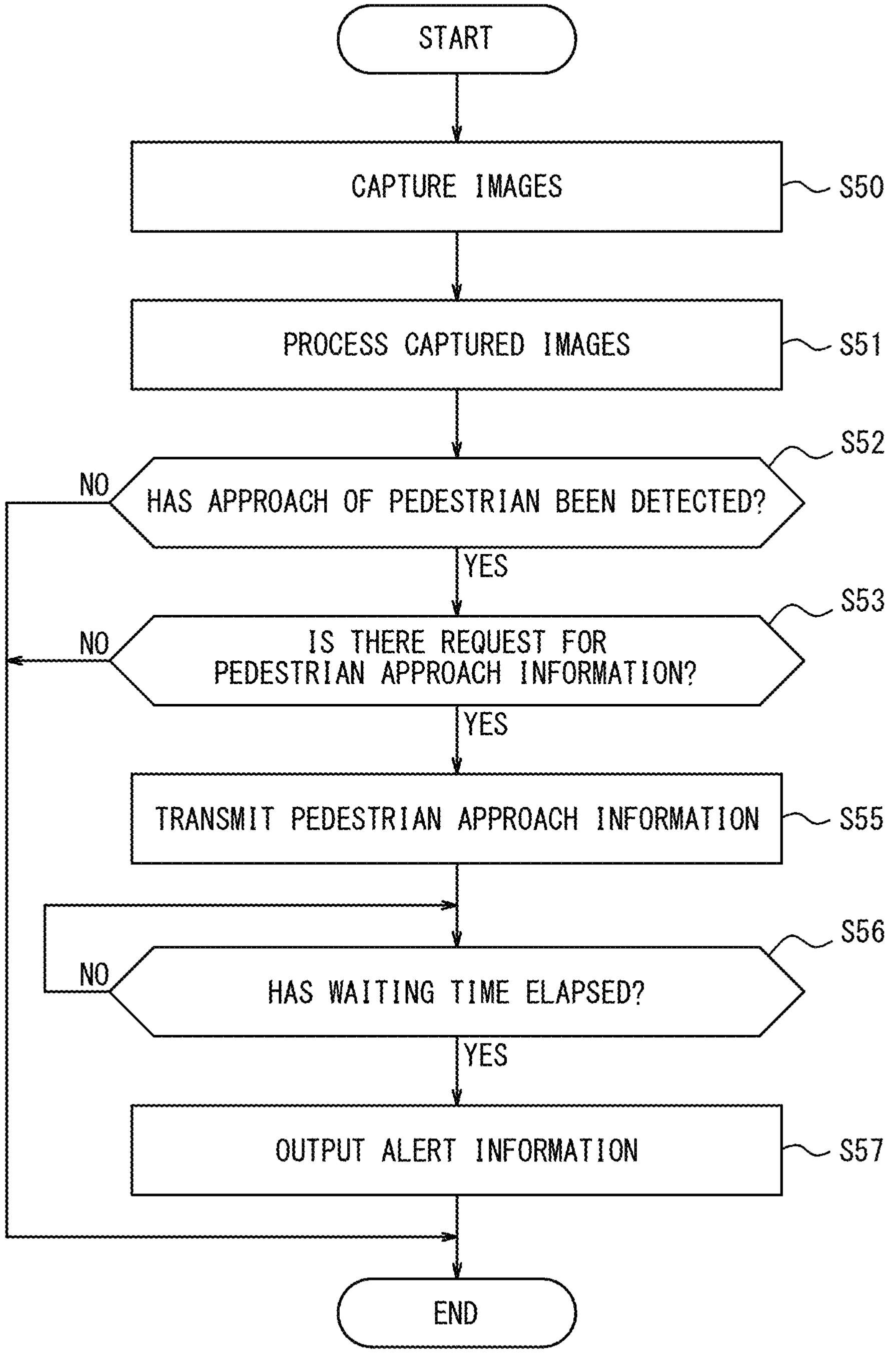
FIG. 5 is a diagram illustrating an example operation procedure of the roadside apparatus.

FIGS. 4 and 5 are flowcharts illustrating operation procedures of the server apparatus 10 and each roadside apparatus 12 in the present embodiment, respectively.

FIG. 4 relates to the operation procedure of the controller 23 when the server apparatus 10 transmits and receives information to and from each vehicle 14 and each roadside apparatus 12. The procedure in FIG. 4 is performed in any appropriate cycles, for example, in cycles of several tens of microseconds to several seconds.

In step S40, the controller 23 acquires positional information on each vehicle 14. The controller 23 receives, by the communication interface 21, the positional information on each vehicle 14, which is transmitted by the vehicle 14 in any appropriate cycles, for example, in cycles of several tens of microseconds to several seconds.

In step S41, the controller 23 derives a time required for each vehicle 14 to reach the point of the nearest roadside apparatus 12. For example, the controller 23 derives, for each vehicle 14, a travel direction and a travel speed based on a change in position with time. The controller 23 identifies, for each vehicle 14, the nearest roadside apparatus 12 in the travel direction. For example, the server apparatus 10 identifies the nearest roadside apparatus 12 for each vehicle 14 by reading out location information on each roadside apparatus 12 stored in advance in the memory 22. When each roadside apparatus 12 is installed at any point, the controller 33 acquires location information by the positioner 34, and transmits the location information to the server apparatus 10 by the communication interface 31. The controller 23 of the server apparatus 10 stores the location information on each roadside apparatus 12 in the memory 22. Alternatively, the controller 23 may identify the nearest roadside apparatus 12, using results derived from previous processing cycles. The controller 23 derives, using any algorithm, a travel distance to the point of installation of the identified nearest roadside apparatus 12. The controller 23 then derives, based on the travel speed and the travel distance of the vehicle 14, the time required for the vehicle 14 to reach the point of the nearest roadside apparatus 12.

In step S42, the controller 23 determines, for each vehicle 14, whether the required time is equal to or less than an upper limit of a reference range. The reference range of the required time is a grace period of, for example, several seconds to several tens of seconds to notify the vehicle 14 of the presence of a pedestrian 13 in the vicinity of the nearest roadside apparatus 12. The reference range of the required time can be arbitrarily determined. When the required time is equal to or less than the upper limit of the reference range (Yes), the controller 23 proceeds to step S43. When the required time is more than the upper limit of the reference range (No), the controller 23 omits step S43 and the later steps and terminates the procedure of FIG. 4.

In step S43, the controller 23 transmits a request for pedestrian approach information and a notification of a lower limit of the reference range for the required time. The controller 23 transmits, by the communication interface 21 to the nearest roadside apparatus 12, the request for the pedestrian approach information and the notification of the lower limit of the reference range for the required time. The pedestrian approach information is information indicating an approach of the pedestrian 13 to a roadway 16 that the roadside apparatus 12 faces. The controller 33 receives, by the communication interface 31, the request for the pedestrian approach information. The lower limit of the reference range may be a time, or a duration of time to be elapsed from the current time. The roadside apparatus 12, in the procedure described in FIG. 5, transmits the pedestrian approach information by the communication interface 31 to the server apparatus 10, in response to the request for the pedestrian approach information, when the controller 33 is detecting the approach of the pedestrian 13 to the roadway 16. In the server apparatus 10, the controller 23 receives, by the communication interface 21, the pedestrian approach information transmitted from the roadside apparatus 12.

In step S45, the controller 23 determines whether the pedestrian approach information has been acquired. When the pedestrian approach information has been acquired from the roadside apparatus 12 (Yes), the controller 23 proceeds to step S46. When the pedestrian approach information has not been acquired from the roadside apparatus 12 (No), the controller 23 omits step S46 and terminates the procedure of FIG. 4.

In step S46, the controller 23 transmits the pedestrian approach information. The controller 23 transmits, by the communication interface 21, the pedestrian approach information received from the roadside apparatus 12 to the vehicle 14 whose nearest roadside apparatus 12 is that roadside apparatus 12. The controller 33 then terminates the procedure of FIG. 4. When the control apparatus of the vehicle 14 receives the pedestrian approach information transmitted from the server apparatus 10, the vehicle 14 slows down so as to be able to respond to sudden movement of the pedestrian 13 until the vehicle 14 closest approaches the roadside apparatus 12, or outputs information to alert the assistant driver with display or audio. This allows the vehicle 14 to be ready to respond to the sudden movement of the pedestrian 13 in the grace period before the vehicle 14 closest approaches the point of the roadside apparatus 12.

FIG. 5 relates to the operation procedure of the controller 33 when the roadside apparatus 12 detects an approach of a pedestrian 13 while transmitting and receiving information to and from the server apparatus 10. The procedure in FIG. 5 is performed in any appropriate cycles, for example, in cycles of several tens of microseconds to several seconds.

In step S50, the controller 33 controls the imager 35 to capture images. The imager 35 captures the visible light images of the surroundings of the roadside apparatus 12, which include a sidewalk, at an arbitrarily set frame rate, and transmits the captured images to the controller 33.

In step S51, the controller 33 processes the captured images. The controller 33 performs any appropriate image processing, such as pattern matching, on the captured images to detect a pedestrian 13. The controller 33 also derives, from changes of the captured images with time, movements and a movement direction of the pedestrian 13.

In step S52, the controller 33 determines whether an approach of the pedestrian 13 to a roadway 16 has been detected. For example, when the movement direction of the pedestrian 13 is toward the roadside apparatus 12, the controller 33 can determine that the pedestrian 13 is approaching the roadway 16 because the roadside apparatus 12 is installed on the roadway 16 side on the sidewalk. On the other hand, when the pedestrian 13 is not moving, moves away from the roadside apparatus 12, or is out of the angle of view of the roadside apparatus 12, the controller 33 can determine that the pedestrian 13 is not approaching the roadway 16. When the approach of the pedestrian 13 has been detected (Yes), the controller 33 proceeds to step S53. When the approach of the pedestrian 13 has not been detected (No), the controller 33 omits step S53 and the later steps and terminates the procedure of FIG. 5.

In step S53, the controller 33 determines the presence or absence of a request for pedestrian approach information. When the controller 33 has received the request for the pedestrian approach information from the server apparatus 10 (Yes), the controller 33 proceeds to step S55. When the controller 33 has not received the request (No), the controller 33 omits step S55 and the later steps and terminates the procedure of FIG. 5.

In step S55, the controller 33 transmits the pedestrian approach information. The controller 33 transmits, by the communication interface 31, the pedestrian approach information to the server apparatus 10. In the server apparatus 10, upon receiving the pedestrian approach information by the communication interface 21, the controller 23 transmits the pedestrian approach information to the vehicle 14 (step S46 of FIG. 4).

In step S56, the controller 33 determines whether a waiting time has elapsed after the pedestrian approach information has been transmitted. The waiting time is a time from when the pedestrian approach information is transmitted until when the pedestrian 13 approaches a distance at which the pedestrian 13 can check information to be presented by the roadside apparatus 12. The waiting time may be set arbitrarily, or may be set to the difference between the current time and the lower limit of the reference range for the required time received from the server apparatus 10. When the waiting time has elapsed (Yes), the control 33 proceeds to step S57. When the waiting time has not elapsed (No), the controller 33 suspends proceeding to step S57.

In step S57, the controller 33 outputs alert information for the pedestrian 13. When the pedestrian 13 is approaching the roadway 16, there is a high probability that the pedestrian 13 is going to cross the roadway 16. The alert information is information to alert by flashing LED lights or by an audio message e.g., "Vehicle is approaching" or "Be careful in crossing". The controller 33 outputs the alert information by the output interface 36. The controller 33 then terminates the procedure of FIG. 5. The presentation of the alert information enables the pedestrian 13 to recognize that the vehicle 14 is traveling and approaching on the roadway 16. At this time, the alert information is output after the waiting time has elapsed. The pedestrian 13 does not receive an alert more than necessary during the waiting time, i.e., while there is a grace period before the vehicle 14 closest approaches, so stress on the pedestrian 13 can be suppressed.

In a variation, step S51 of the procedure of FIG. 5 is performed in the server apparatus 10. The controller 33 of the roadside apparatus 12 transmits, by the communication interface 31, the captured images to the server apparatus 10. Then, the server apparatus 10 executes the processing of the captured images in step S51, and the execution results, including whether a pedestrian 13 has been detected and a movement direction, a movement speed, and the like in the case of having detected the pedestrian 13, are transmitted from the server apparatus 10 to the roadside apparatus 12. The controller 33 of the roadside apparatus 12 executes step S52 and later steps based on the execution results received from the server apparatus 10. According to such a variation, it is possible to reduce a processing load on the controller 33 of the roadside apparatus 12.

In another variation, in step S43 of FIG. 4, the server apparatus 10 may transmit, to the roadside apparatus 12, the request for the pedestrian approach information on condition that the vehicle 14 passes through a reference route. For example, there is provided a step, between steps S40 and S43, in which the controller 23 estimates a travel route of the vehicle 14 based on changes of the position of the vehicle 14 with time and determines whether the travel route corresponds to the reference route. The controller 23 can then proceed toward step S43 when the travel route corresponds to the reference route, whereas terminate the procedure of FIG. 4 when the travel route does not correspond to the reference route. For example, for each point at which the roadside apparatus 12 can be installed, a route through which many vehicles travel toward each point may be statistically derived in advance, and used as the reference route.

According to the present embodiment described above, even when a pedestrian 13 starts to cross a roadway 16 from a blind spot of each traveling vehicle 14, the presence of the pedestrian 13 can be recognized in advance by the vehicle 14, which is driven automatically, or by the assistant driver of the vehicle 14, by receiving pedestrian approach information from the roadside apparatus 12. On the other hand, the pedestrian 13 can be made aware of the presence of the vehicle 14 by alert information, thus improving traffic safety. Since the pedestrian approach information is transmitted to the vehicle 14 with some time to spare, even when it takes time for the pedestrian 13 to cross the roadway 16 due to unforeseen circumstances such as the pedestrian 13 falling down, the vehicle 14 can make preparations in advance before reaching the point of the roadside apparatus 12, such as slowing down in order to avoid contact with the pedestrian 13. Furthermore, the alert information is presented to the pedestrian 13 after a lapse of some time after the pedestrian approach information has been transmitted to the vehicle 14, so the pedestrian 13 may not receive the alert information during the time from when the pedestrian approach information has been transmitted to when the alert information is presented, i.e., to when the vehicle 14 approaches the point of the roadside apparatus 12 to some extent. This allows the pedestrian 13 to cross the roadway 16 without requiring more caution than necessary.

While the embodiment has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each element, each step, or the like can be rearranged without logical inconsistency, and a plurality of elements, steps, or the like can be combined into one or divided.

The invention claimed is:

1. A roadside apparatus comprising:

a communication interface configured to transmit and receive information;

an imager configured to capture an image of a pedestrian;

an output interface configured to output information for the pedestrian; and a controller configured to:

receive, from a server apparatus, a request for first information, transmit, to the server apparatus, the first information indicating that an approach of the pedestrian to a roadway has been detected based on the captured image, thereafter output second information to alert the pedestrian for a vehicle traveling toward the roadside apparatus, wherein the server apparatus is configured to transmit the first information to the vehicle upon receiving the first information from the roadside apparatus, and determine whether a waiting time has elapsed after the first information has been transmitted, the waiting time corresponding to a time from when the first information is transmitted until when the pedestrian approaches a distance at which the pedestrian can check information to be presented by the roadside apparatus.

2. The roadside apparatus according to claim 1, wherein the controller is configured to transmit the first information on condition that the vehicle is located within a predetermined range from the roadside apparatus.

3. The roadside apparatus according to claim 2, wherein the controller is configured not to transmit the first information when the vehicle is located outside the predetermined range.

4. The roadside apparatus according to claim 1, wherein the controller is configured to transmit the first information on condition that the vehicle travels along a predetermined route toward the roadside apparatus.

5. The roadside apparatus according to claim 1, wherein the controller is configured to detect the approach based on the captured image, to thereby transmit the first information.

6. The roadside apparatus according to claim 1, wherein the controller is configured to output the second information, after a lapse of a predetermined the waiting time after the first information has been transmitted.

7. A system comprising:

a server apparatus; and a roadside apparatus, wherein:

the server apparatus is configured to transmit, to the roadside apparatus, a request for first information, the roadside apparatus is configured to transmit, to the server apparatus, the first information indicating that an approach of a pedestrian to a roadway has been detected based on a captured image of the pedestrian, and thereafter output second information to alert the pedestrian for a vehicle traveling toward the roadside apparatus, the server apparatus is configured to transmit the first information to the vehicle upon receiving the first information from the roadside apparatus, and the roadside apparatus is configured to determine whether a waiting time has elapsed after the first information has been transmitted, the waiting time corresponding to a time from when the first information is transmitted until when the pedestrian approaches a distance at which the pedestrian can check information to be presented by the roadside apparatus.

8. The system according to claim 7, wherein the roadside apparatus is configured to transmit the first information on condition that the vehicle is located within a predetermined range from the roadside apparatus.

9. The system according to claim 8, wherein the roadside apparatus is configured not to transmit the first information when the vehicle is located outside the predetermined range.

10. The system according to claim 7, wherein the roadside apparatus is configured to transmit the first information on condition that the vehicle travels along a predetermined route toward the roadside apparatus.

11. The system according to claim 7, wherein the roadside apparatus is configured to detect the approach based on the captured image, to thereby transmit the first information.

12. The system according to claim 7, wherein the roadside apparatus is configured to output the second information, after a lapse of a predetermined the waiting time after the first information has been transmitted.

13. An operating method of a system including a server apparatus and a roadside apparatus, the operating method comprising:

transmitting, by the server apparatus to the roadside apparatus, a request for first information;

transmitting, by the roadside apparatus to the server apparatus, the first information indicating that an approach of a pedestrian to a roadway has been detected based on a captured image of the pedestrian, and thereafter outputting, by the roadside apparatus, second information to alert the pedestrian for a vehicle traveling toward the roadside apparatus;

transmitting, by the server apparatus, the first information to the vehicle upon receiving the first information from the roadside apparatus; and determining, by the roadside apparatus, whether a waiting time has elapsed after the first information has been transmitted, the waiting time corresponding to a time from when the first information is transmitted until when the pedestrian approaches a distance at which the pedestrian can check information to be presented by the roadside apparatus.

14. The operating method according to claim 13, wherein the roadside apparatus is configured to transmit the first information on condition that the vehicle is located within a predetermined range from the roadside apparatus.

15. The operating method according to claim 14, wherein the roadside apparatus is configured not to transmit the first information when the vehicle is located outside the predetermined range.

16. The operating method according to claim 13, wherein the roadside apparatus is configured to transmit the first information on condition that the vehicle travels along a predetermined route toward the roadside apparatus.

17. The operating method according to claim 13, wherein the roadside apparatus is configured to detect the approach based on the captured image, to thereby transmit the first information.

* * * * *